United States Patent [19]

Watanabe et al.

[11] 4,425,595
[45] Jan. 10, 1984

[54] LOCKING DEVICE OF A STARTING POSITION SEARCHING MECHANISM

[75] Inventors: Wataru Watanabe; Shoji Kaneko, both of Toda, Japan

[73] Assignee: Clarion Co., Ltd., Tokyo, Japan

[21] Appl. No.: 297,457

[22] Filed: Aug. 28, 1981

[30] Foreign Application Priority Data

Sep. 8, 1980 [JP] Japan .............................. 55-126583[U]

[51] Int. Cl.³ .................... G11B 15/18; G11B 17/00; G11B 19/02
[52] U.S. Cl. ................................... 360/137; 360/72.1
[58] Field of Search ................ 360/74.4, 55, 71, 72.1, 360/73, 74.1, 105, 137, 75; 179/100.1 PS, 100.1 VC; 242/191

[56] References Cited

U.S. PATENT DOCUMENTS

| | | | |
|---|---|---|---|
| 4,176,383 | 11/1979 | Suzuki | 360/137 |
| 4,228,472 | 10/1980 | Magata | 360/72.1 |
| 4,323,935 | 4/1982 | Koizumi | 360/72.1 |

Primary Examiner—Robert M. Kilgore
Attorney, Agent, or Firm—Flynn, Thiel, Boutell & Tanis

[57] ABSTRACT

A locking device for locking a starting position searching mechanism which comprises a slide plate for sliding when being pushed by a fast-forwarding operational rod or rewinding operational rod and a limit switch which is actuated by the slide plate. The fast-forwarding operational rod and the rewinding operational rod are formed with notches at the top ends with which the top end of an off plate is engageable, the off plate is slidably connected to the lock plate, a spring is provided between the off plate and the lock plate for pulling them so as to shorten their total length, an electromagnetic plunger is provided at the base end of the lock plate for attracting the lock plate together with the off plate and the electromagnetic plunger is to be energized by the limit switch.

4 Claims, 2 Drawing Figures

LOCKING DEVICE OF A STARTING POSITION SEARCHING MECHANISM

BACKGROUND OF THE INVENTION

1. Field of the Invention

This invention relates to a starting point searching mechanism in a cassette deck, and more particularly to a mechanism for locking fast-forward (FF) and rewind (REW) operational rods in the starting point searching mode as well as cancelling the lock to return the tape deck to the normal reproducing mode.

2. Description of the Prior Art

When selecting a desired music selection from several music selections recorded on a cassette tape and setting the tape at the desired starting point, the tape is generally subjected to FF or REW condition. That is, when one of the FF or REW operational rods is pushed, a limit switch is pushed by it. Then, an electromagnetic plunger is energized in accordance with the direction from the limit switch to thereby attract the FF or REW operational rod, thus locking it. At the same time, various mechanisms interlocking with the FF and REW operational rods operate to drive a tape in the FF or REW direction at a high speed. Accordingly, a head detects a signal for the starting point searching previously recorded at the beginning of the desired music selection on the cassette tape to thereby deenergize the plunger by the signal. Thus, the operational rod which has been is FF or REW condition gets unlocked to return in the normal reproducing mode.

On the other hand, it is also required to release the locking of the FF or REW operational rod which has been set in the starting point searching mode irrespective of the signal for the starting point searching in the cassette tape when reproducing a tape without any signal for the starting point searching being recorded thereon or when manually selecting a desired music selection even if there is recorded a starting point searching signal on the tape, for example.

In this connection, a tape deck needs to include a mechanism for manually deenergizing the electromagnetic plunger which locks the FF or REW operational rod. In this case, such a manual cancelling mechanism may preferably be mounted integrally with the FF or REW operational rod without providing it separately from them so as to minimize and simplify the whole mechanism as well as to simplify the operation of the tape deck.

OBJECT OF THE INVENTION

It is therefore an object of the present invention to solve the above problem, and more specifically to provide a locking device of a starting point searching mechanism capable of not only locking one of an FF and REW operational rods in the starting point searching mode by pressing it but also manually cancelling the starting point searching mode by pressing the other operational rod.

SUMMARY OF THE INVENTION

In accordance with the present invention there is provided a locking device of a starting point searching mechanism for use in a magnetic recording/reproducing apparatus which comprises:
a fast-forwarding operational means;
a rewinding operational means;
a slidable means for sliding in response to the operation of said fast-forwarding operational means or said rewinding operational means;
a switch for being actuated by said slidable means;
a locking means for engaging with said fast-forwarding operational means or rewinding operational means in response to the operation of said fast-forwarding operational means;
an electromagnetic plunger means connected to said locking means for being controlled by said switch; and
said locking means being arranged to be released from engagement with one of said fast-forwarding and rewinding operational means by the operation of the other operational means.

DETAILED DESCRIPTION OF THE PREFERRED EMBODIMENTS

Figure 1:
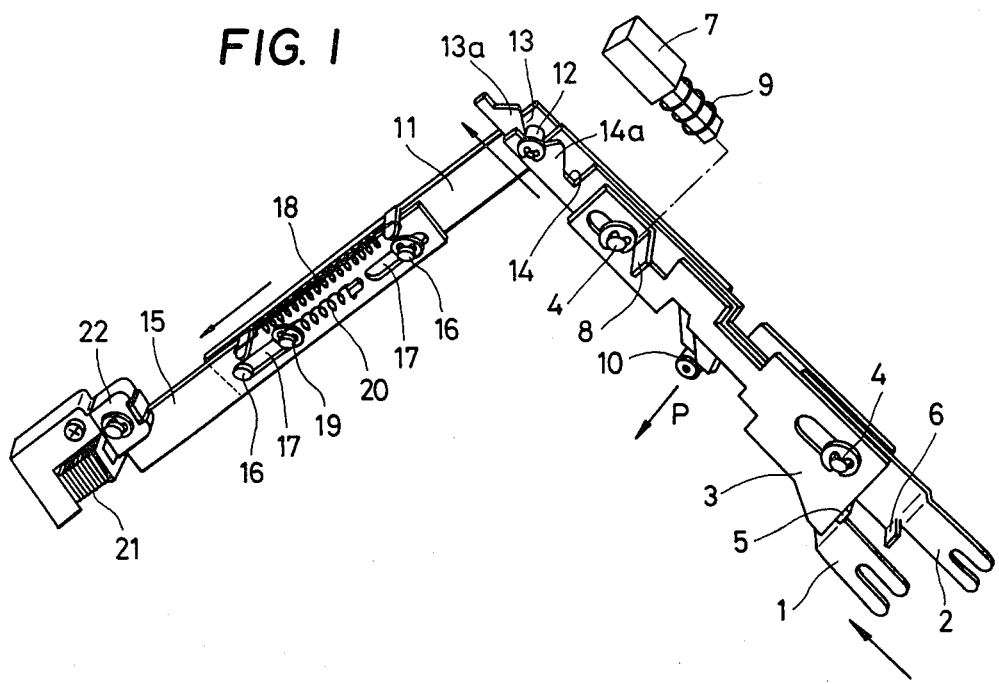
FIG. 1 shows a perspective view as seen from the lower direction of a locking device according to the present invention.
Figure 2:
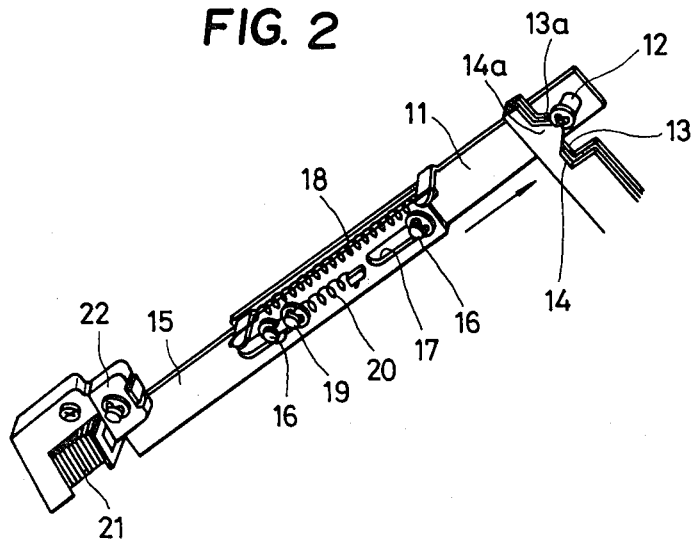
FIG. 2 shows a perspective view of engaging portion between the off-plate and the operational buttons which are on way of being released from the locking condition.

The present invention will now be described in detail referring to the preferred embodiment illustrated in the drawings. Incidentally, the drawings are perspective views of the device of the above embodiment as shown from the lower direction.

In the drawings, the reference numeral 1 denotes an FF operational rod, 2 a REW operational rod provided under the FF operational rod and 3 a slide plate provided under the REW operational rod. The above members are in engagement with guide pins 4, 4 secured on a chassis of the tape deck so that the members are independently slidable in the forward and rearward directions along the guide pins 4, 4. The FF operational rod 1 and the REW operational rod 2 are normally pulled to the forward direction (toward the base end of the operational rods) by means of springs (not shown) provided between the chassis and the operational rods 1 and 2 are so to return in their original positions after pushed in. The FF and REW operational rods 1 and 2 are formed with pushing hooks 5 and 6 for engaging with the slide plate 3. Thus, when the FF operational rod 1 or the REW operational rod 2 is pushed, the slide plate 3 is also pushed by the pushing hook 5 or 6 to forwardly displace therewith.

Near the slide plate 3 there is provided a limit switch 7 for energizing an electromagnetic plunger. A pushing hook 8 integrally formed on the slide plate 3 engages with an operational rod of the limit switch 7. The operational rod of the limit switch 7 is provided with a coil spring 9 for pulling the operational rod to a projecting direction (to the off direction of the plunger). The coil spring 9 also presses the slide plate 3 toward the forward direction of the operational rods 1 and 2.

In the central portions of the FF and REW operational rods 1 and 2 there are formed pressing portions 10 for pressing a FF-REW pin P. The FF-REW pin P allows the tape driving system such as a pinch roller, idler, etc, a head and the like to be interlocked with each other, and thus, the tape driving system, etc. is switched in the FF-REW mode (starting point searching mode) when the FF-REW pin P is displaced to the arrow direction in FIG. 1.

On the other hand, an off plate 11 is provided in a manner intersecting with the top ends of the FF and REW operational rods 1 and 2. On the lower surface of the off plate 11 there is provided an engaging roller 12 perpendicularly thereof for engaging with one of notches 13, 14 formed in the top end portions of the FF and REW operational rods 1 and 2. That is, the notches 13, 14 are formed with protuberances 13a, 14a at the top ends thereof so that the engaging roller 12 slides along the edge of the protuberance 13a or 14a, when the operational rod 1 or 2 is pushed and falls into one of the notches 13 and 14.

A lock plate 15 is slidably connected to the base end portion of the off plate 11. In this case, the off plate 11 may be provided with two guide pins 16, 16 protruding thereon to be inserted into elongated slits 17, 17 formed in the lock plate 15. At the same time, the off plate 11 and the lock plate 15 may be pulled toward each other by a spring 18 provided therebetween. Further, the off plate 11 and the lock plate 15 connected to each other are arranged to be slidable with respect to the chassis. That is, a guide pin 19 secured on the chassis is inserted into an elongated slit formed in the off plate 11 and an elongated slit 17 formed in the lock plate 15 to allow the plates 11 and 15 to displace along the guide pin 19. Further, a spring 20 provided between the guide pin 19 and the lock plate 15 so as to pull the both plates 11 and 15 toward the base ends thereof (toward the electromagnetic plunger).

To the base end of the lock plate 15 there is provided a suction type electromagnetic plunger 21 and a core 22 secured to the base portion of the lock plate 15 in correspondance with the plunger 21. The electromagnetic plunger 21 is energized when the limit switch 7 is pushed, and on the other hand, it is deenergized when the starting point searching signal on the tape is supplied, when the limit switch 7 is released and when the cassette tape is ejected from the tape deck to turn the main switch off.

The locking mechanism according to the present invention as described above operates as follows.

First, to carry out the starting point searching of the tape, one of the FF and REW operational rods (the FF operational rod in the drawings) is pushed. Thus, the FF-REW pin P is pushed to the arrow direction and the tape driving system and the like are accordingly set in the starting point searching mode. When the FF operational rod 1 is pushed, the notch 13 provided at the top end thereof receives the engaging roller 12 of the off plate 11 therein. At the same time, the slide plate 3 is pushed by the pushing hook 5 formed in the FF operational rod 1 to move so as to push the limit switch 7, thus energizing the electromagnetic plunger 21. Consequently, the lock plate 15 and the off plate 11 are attracted by the electromagnetic plunger 21 so that the engaging roller 12 at the top end of the off plate 11 and the notch 13 at the top end of the FF operational rod 1 come to engage with each other. Thus, the FF operational rod 1 is brought in the pressed condition, that is, it is locked in the starting point searching mode.

Next, in order to manually cancel the above locking condition, the other operational rod (the REW operational rod 2 in the drawings) is pushed. When the REW operational rod 2 is thus pushed, the engaging roller 12 moves along the edge of the protuberance 14a formed at the top end of the REW operational rod 2 to allow the off plate 11 to slide toward the top end thereof. Therefore, the FF operational rod 1 which has been locked by the engaging roller 12 gets released therefrom to return forwardly. In this case, the electromagnetic plunger 21 is kept energized to keep attracting the lock plate 15, and accordingly, only the off plate 11 moves the respect to the lock plate 15 against the spring force of the spring 18 so as to elongate the total length. When the FF operational rod 1 which has been locked returns in its original position, the slide plate 3 which has been pushed by the FF operational rod 1 also returns, and therefore, the limit switch is turned off to deenergize the electromagnetic plunger 21. Consequently, the lock plate 15 gets free to return toward the shortening direction together with the off plate 11 by the function of the spring 18. When the FF operational rod 1 having been locked thus returns, the FF-REW pin P having been compressed by the FF operational rod 1 also returns, thus setting the tape deck in its normal reproducing mode.

Incidentally, when the REW operational rod 2 is pushed to be locked in the starting point searching condition, the locking condition can be released in the same manner as mentioned above by pushing the FF operational rod 1 as contrary to the above-described example. Further, when the main switch is turned off upon the starting point searching signal or upon ejecting the tape cassette, the electromagnetic plunger is deenergized to cancel the locking condition.

As described above, the locking mechanism according to the present invention is arranged to unlock one of operational rods by pushing the other operational rod which has not been locked, and therefore, it has a large advantage as being capable of cancelling the starting point searching condition as required by a manual operation. Particularly, according to the present invention, the lock cancelling means utilizes an FF operational rod and a REW operational rod, thus attaining the objects of minimizing and simplifying the whole mechanism as well as simplifying the operation thereof.

We claim:

1. A locking device for a starting point searching mechanism in a magnetic tape machine, comprising:
   an assembly of an elongated, fast-forward operational rod, an elongated, rewind operational rod and an elongated slide plate which are parallel with each other and disposed one on top of the other to form a stack, said fast-forward operational rod being mounted for longitudinal sliding movement between a non-actuated position and an actuated position in which it is effective for actuating driving of the tape at a fast speed, said rewind operational rod being mounted for longitudinal sliding movement independently of said fast-forward operational rod between a non-actuated position and an actuated position in which it is effective for actuating rewinding of the magnetic tape, said slidable plate being longitudinally slidable from a non-actuated position to an actuated position in response to movement of either of said fast-forward operational rod or said rewind operational rod to its respective actuated position, said fast-forward operational rod and said rewind operational rod each having a notch therein which notches are located adjacent to corresponding one ends of said rods;
   a switch mounted for actuation in response to movement of said slide plate to said actuated position thereof;

an elongated, longitudinally slidable, off plate located adjacent to said corresponding one ends of said rods, said off plate having engaging means mounted thereon which engaging means is releasably receivable in one of said notches at a time for releasably locking one of said rods in its actuated position;

an elongated, longitudinally slidable, lock plate connected to said off plate for lengthwise sliding movement with respect thereto;

a spring connected between said off plate and said lock plate for resiliently urging said plates toward each other;

an electromagnetically operated plunger connected to be operated in response to actuation of said switch and coupled to said lock plate for urging said lock plate and thereby said off plate in a direction in which said engaging means on said off plate is releasably received in one of said notches whereby to releasably lock one of said rods in its actuated position;

and release means operable in response to movement of the other rod to its actuated position for removing said engaging means from said one notch to release said one rod.

2. A locking device as claimed in claim 1 in which said rods and said slide plate are resiliently urged toward their non-actuated positions, and in which said release means comprises a protuberance on each of said rods adjacent to the notch thereof, the protuberance of said other rod being engageable with said engaging means on said off plate upon movement of said other rod toward its actuated position whereby to move said engaging means out of the notch of said one rod and thereby release said one rod so that it can return to its non-actuated position.

3. A locking device as claimed in claim 2 in which said notches open in one lateral direction from said rods, said off plate extends perpendicularly to said rods in the opposite lateral direction, one longitudinal end of said off plate extending over said rods, said engaging means being an engaging roller mounted on said one longitudinal end of said off plate and being pulled by said spring in a direction so as to enter a notch when that notch becomes aligned with said engaging roller.

4. A locking device as claimed in claim 3 in which said off plate and said lock plate are elongated plates having adjacent overlapping ends connected to each other so that said plates are independently movable in parallel with each other in the lengthwise direction thereof.

* * * * *